(12) United States Patent
Camilo et al.

(10) Patent No.: US 10,895,176 B2
(45) Date of Patent: Jan. 19, 2021

(54) TRIGGER WHEEL WITH A WAVE-SHAPED FORMED FEATURE FOR A CAMSHAFT PHASER

(71) Applicant: Schaeffler Technologies AG & Co. KG, Herzogenaurach (DE)

(72) Inventors: Alexandre Camilo, Rochester Hills, MI (US); Renato de Oliveira Ghiraldi, Madison Heights, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/530,067

(22) Filed: Aug. 2, 2019

(65) Prior Publication Data

US 2020/0056515 A1 Feb. 20, 2020

(30) Foreign Application Priority Data

Aug. 20, 2018 (DE) .................. 10 2018 120 160

(51) Int. Cl.
| | |
|---|---|
| *F01L 1/344* | (2006.01) |
| *F01L 1/348* | (2006.01) |
| *F16H 53/04* | (2006.01) |
| *F16H 7/12* | (2006.01) |
| *F02B 67/06* | (2006.01) |
| *F01L 1/02* | (2006.01) |
| *F02D 41/00* | (2006.01) |

(52) U.S. Cl.
CPC ............... *F01L 1/344* (2013.01); *F01L 1/026* (2013.01); *F01L 1/348* (2013.01); *F02B 67/06* (2013.01); *F02D 41/009* (2013.01); *F16H 7/1245* (2013.01); *F16H 53/04* (2013.01); *F01L 2820/041* (2013.01)

(58) Field of Classification Search
CPC ... F01L 2820/041; F01L 1/3442; F01L 1/344; F01L 1/047; F01L 1/34; F01L 1/348; F01L 1/026; F02D 41/009; F16H 7/1245; F16H 53/04; F02B 67/06
USPC .......................... 123/90.17, 90.15; 464/160
See application file for complete search history.

(56) References Cited

U.S. PATENT DOCUMENTS

| | | | | |
|---|---|---|---|---|
| 5,290,974 | A * | 3/1994 | Douglas .............. | F01N 13/1805 181/228 |
| 6,386,166 | B1 * | 5/2002 | Scott ........................ | F01L 1/34 123/90.17 |

(Continued)

FOREIGN PATENT DOCUMENTS

| | | | |
|---|---|---|---|
| DE | 102010015716 A1 * | 10/2010 | ............ F01L 1/3442 |
| DE | 102013209054 A1 | 11/2014 | |

(Continued)

OTHER PUBLICATIONS

Camilo et al., U.S. Appl. No. 16/139,123, filed Sep. 24, 2018.

*Primary Examiner* — Patrick Hamo
*Assistant Examiner* — Wesley G Harris
(74) *Attorney, Agent, or Firm* — Matthew V. Evans

(57) ABSTRACT

This disclosure relates to a trigger wheel for a camshaft adjuster, having a side wall extending along a central longitudinal axis, wherein a formed feature made to project in a radial direction of the longitudinal axis is formed in a circumferential region of the side wall. The formed feature is provided at least in part with a wave profile. Moreover, the disclosure relates to a camshaft adjuster having this trigger wheel.

16 Claims, 6 Drawing Sheets

(56) References Cited

U.S. PATENT DOCUMENTS

| | | | | |
|---|---|---|---|---|
| 2003/0084862 A1* | 5/2003 | Pachmann | ........ | F01L 1/34 |
| | | | | 123/90.15 |
| 2006/0278188 A1* | 12/2006 | Payne | ........ | F01L 1/344 |
| | | | | 123/90.17 |
| 2009/0211549 A1* | 8/2009 | Myers | ........ | F01L 1/3442 |
| | | | | 123/90.17 |
| 2010/0199936 A1* | 8/2010 | Weiss | ........ | F01L 1/3442 |
| | | | | 123/90.15 |
| 2013/0180483 A1* | 7/2013 | Weisser | ........ | F01L 1/344 |
| | | | | 123/90.15 |

FOREIGN PATENT DOCUMENTS

| | | | | |
|---|---|---|---|---|
| DE | 102014211431 A1 * | 12/2015 | ........ | F01L 1/3442 |
| DE | 102014212615 B4 * | 9/2017 | | |
| DE | 102016220938 A1 * | 4/2018 | ........ | F01L 1/344 |
| WO | WO-9410400 A1 * | 5/1994 | ........ | F16B 13/06 |

* cited by examiner

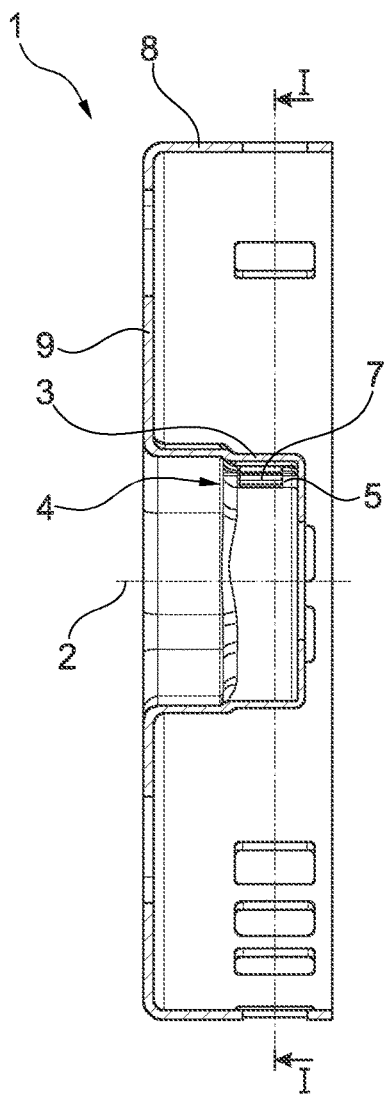
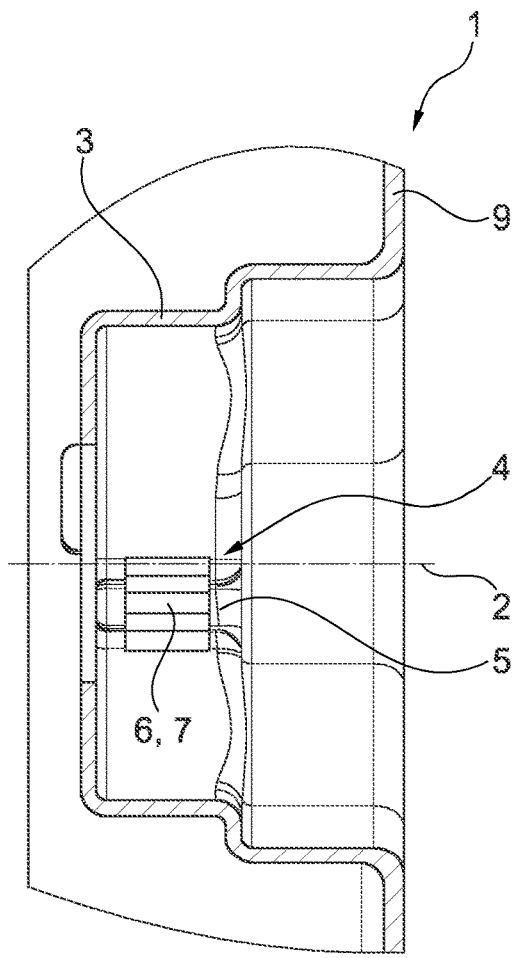
Fig. 4
Fig. 5
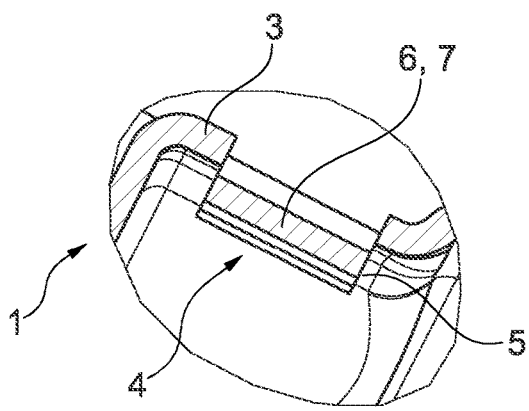
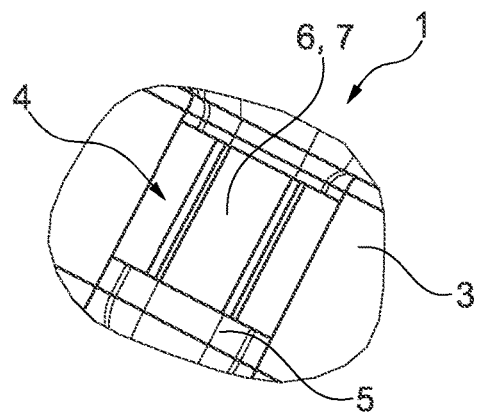
Fig. 6
Fig. 7

TRIGGER WHEEL WITH A WAVE-SHAPED FORMED FEATURE FOR A CAMSHAFT PHASER

CROSS-REFERENCE TO RELATED APPLICATIONS

This application claims priority under 35 U.S.C. Section 119 of German Patent Application No. DE 10 2018 120 160.5 filed Aug. 20, 2018, the disclosure of which is incorporated herein by reference.

TECHNICAL FIELD

This disclosure relates to a trigger wheel for a camshaft adjuster, having a side wall extending along a central longitudinal axis, wherein a formed feature projecting in a radial direction of the longitudinal axis is formed in a circumferential region of the side wall. In principle, the formed feature can be made to project inward or outward in a radial direction relative to the longitudinal axis. Moreover, the invention relates to a camshaft adjuster, possibly a camshaft adjuster of the rotary vane type, for an internal combustion engine of a motor vehicle, such as a passenger car, truck, bus or some other utility vehicle.

BACKGROUND

Camshaft adjusters and trigger wheels of the type in question are already sufficiently well known from the prior art. DE 10 2013 209 054 A1, for example, discloses a camshaft adjuster having a spring mounting connected to a rotor, wherein said spring mounting can be designed as a trigger wheel.

However, it has proven a disadvantage with the embodiments known from the prior art that, in the event of relatively rough handling as part of an assembly process, the bayonet noses/projections that are usually implemented and are used on the trigger wheel cannot offer a sufficiently robust interface with the rotor of the camshaft adjuster; torsional loading by a preloading force and/or torsional loading caused by the installation of a central valve pin can lead to deformations of the bayonet noses. Moreover, there is the problem that the designs used hitherto require relatively complex and expensive tool machining.

SUMMARY

It is therefore the object of the present disclosure to eliminate the disadvantages known from the prior art and, in particular, to make available a structure for a more stable bayonet joint, which should at the same time be simpler to produce.

According to the disclosure, this is achieved by virtue of the fact that the formed feature is provided at least in part with a wave profile.

This wave shape, which is also referred to as a "bird wing" profile, forms a particularly firm interface with the rotor of the camshaft adjuster and can be implemented with relatively small and simple presses/pressing tools in comparison with the existing design. Moreover, this shape does not require machining, which may give rise to chips or material fragments.

Further advantageous embodiments are explained in greater detail below.

If the wave profile is implemented on a (stamped) tab freed from the side wall in an axial direction, the wave profile can be formed in a particularly simple manner.

The tab advantageously projects inward as viewed in the radial direction of the longitudinal axis (starting from the formed feature). Toward the circumferential sides, the tab can merge in one piece/integrally into the side wall. This further increases the robustness of the formed feature.

The wave profile can form a one-dimensional wave (with one direction of propagation); the wave profile can extend in a circumferential direction (around the longitudinal axis).

Moreover, the disclosure relates to a camshaft adjuster (perhaps a hydraulically actuated rotary vane type) for an internal combustion engine of a motor vehicle, having a stator, a rotor rotatable relative to the stator, and a trigger wheel according to the disclosure in accordance with at least one of the embodiments described above. The trigger wheel can be connected to the rotor or the stator by a bayonet joint.

In other words, a timing interface for a trigger wheel of a camshaft adjuster is thus implemented according to the disclosure. A projection in the form of a wave or of a "bird wing" is formed in the trigger wheel.

BRIEF DESCRIPTION OF THE DRAWINGS

The disclosure will now be explained in greater detail below by means of figures.

In the drawings:

FIG. 4 shows a longitudinal section through the trigger wheel, wherein, in addition, a section line denoting the section shown in FIG. 1 is indicated by "I-I", FIG. 5 shows a longitudinal section through the trigger wheel in the inner region indicated by "V-V" in FIG. 3, FIG. 6 shows a detailed longitudinal section through the trigger wheel in the region of a formed feature introduced in the side wall, along the section line indicated by "VI-VI" in FIG. 2, FIG. 7 shows a detail view of the formed feature from a radial inner side.

The figures are of a purely schematic nature and serve only to aid understanding of the disclosure. Identical elements are provided with the same reference characters.

DETAILED DESCRIPTION

The construction of a trigger wheel 1 according to the disclosure is readily apparent in conjunction with FIGS. 1 to 8. During the operation of a camshaft adjuster, the trigger wheel 1 is typically used as a sensor wheel, by means of which a rotational position and/or a speed of the stator or of the rotor of the camshaft adjuster are/is detected. Accordingly, the trigger wheel 1 is employed in a camshaft adjuster, perhaps a hydraulic camshaft adjuster of the rotary vane type. The trigger wheel 1 is can be connected by a bayonet joint to a stator or to a rotor of the camshaft adjuster, said rotor being rotatable relative to the stator. The camshaft adjuster is typically used to adjust the timings of the gas exchange valves of an internal combustion engine.

Figure 9:
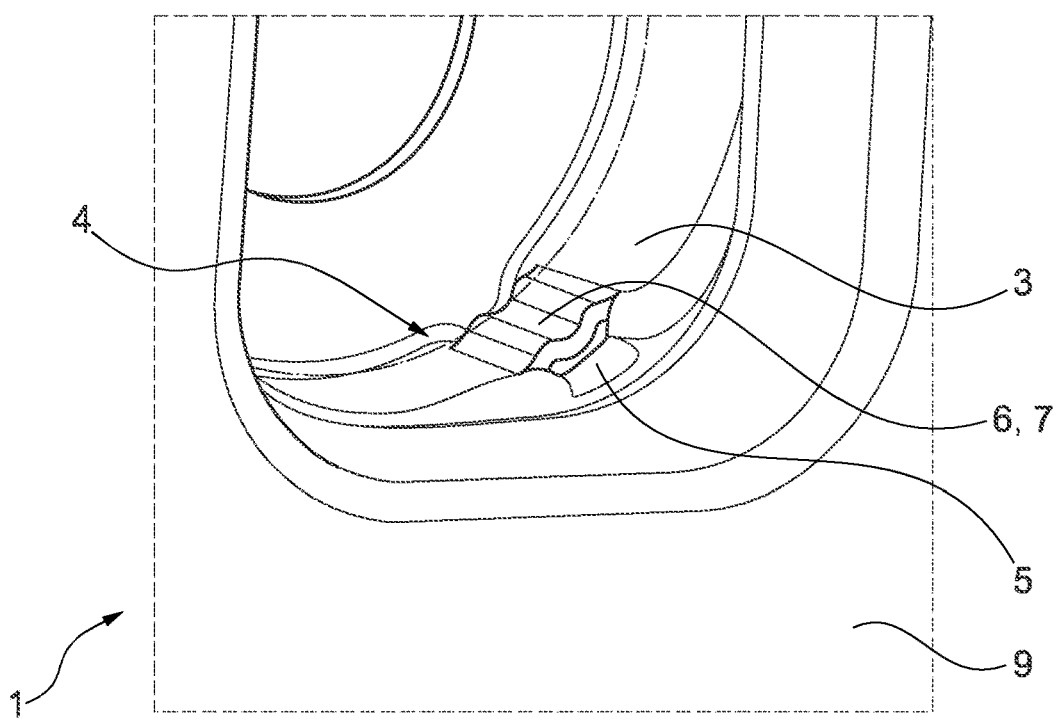
FIG. 9 shows a perspective illustration of a radial inner side of the side wall in the region of the formed feature.
Figure 10:
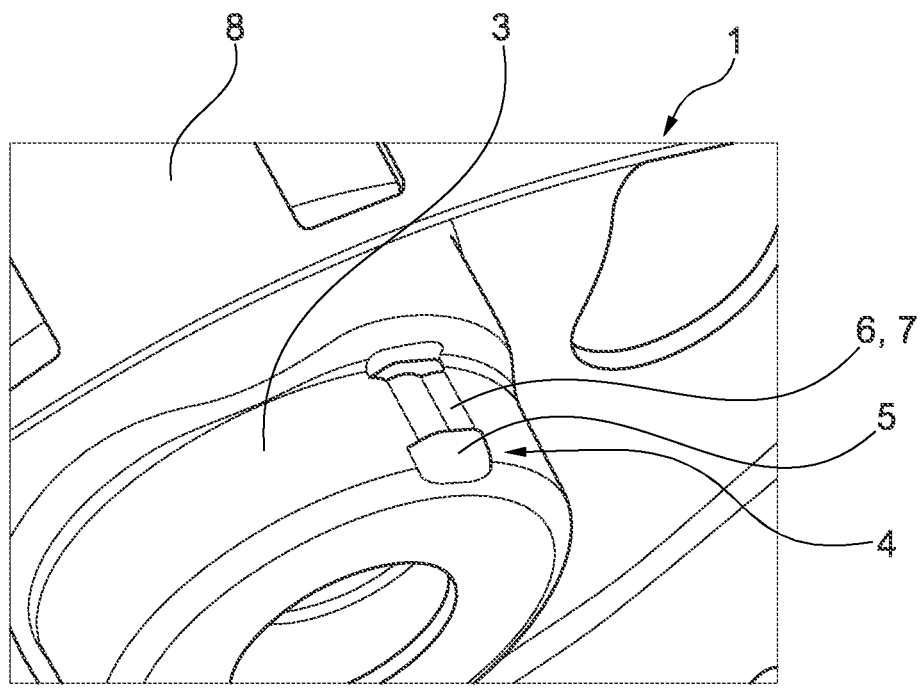
FIG. 10 shows a perspective illustration of a radial outer side of the side wall in the region of the formed feature.
Figure 11:
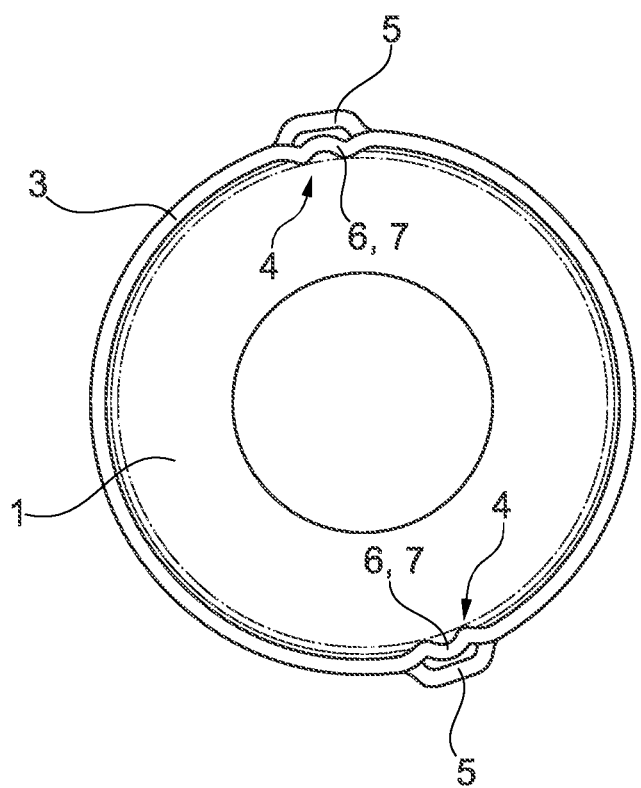
FIG. 11 shows a cross-sectional illustration of the trigger wheel in the region of the formed features.
Figure 12:
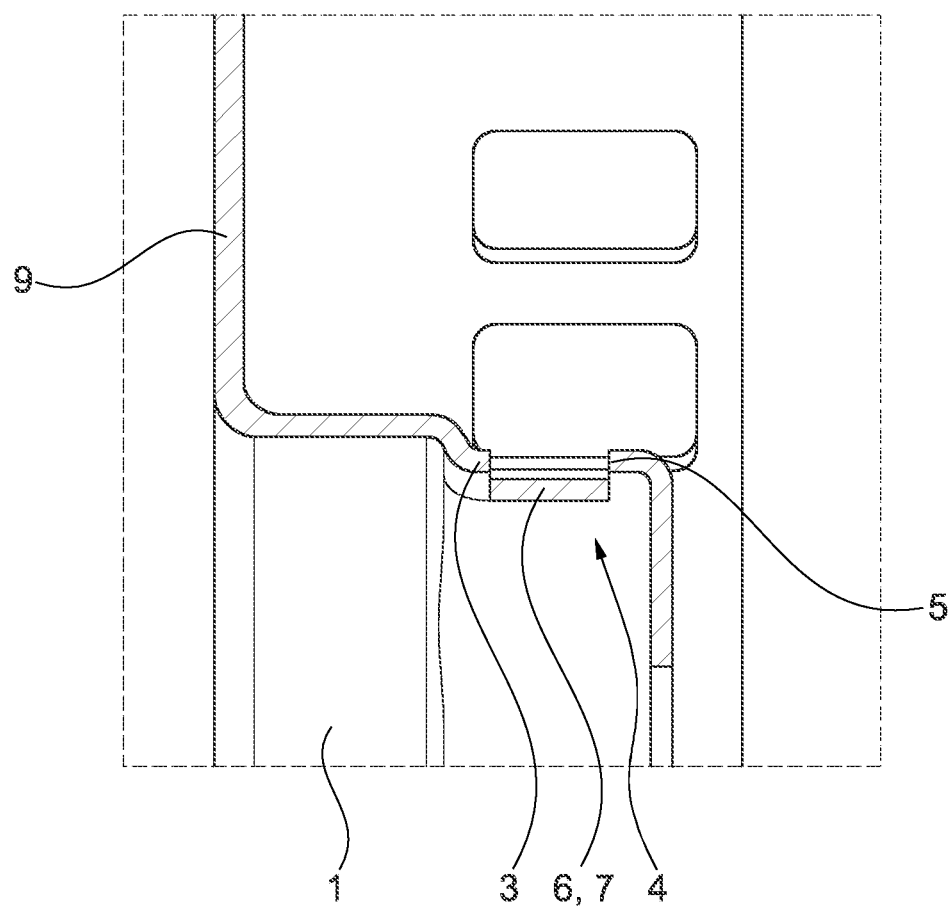
FIG. 12 shows a longitudinal section through the trigger wheel in the region of one of the formed features.

In this embodiment, the trigger wheel 1 fundamentally has a radial outer sleeve region 8, which extends along a central longitudinal axis 2 (axis of rotation) of the trigger wheel 1, as can be seen in FIG. 4 for example. From an axial end of the sleeve region 8, the trigger wheel 1 extends inward in a radial direction via a disk region 9. Once again on a radial inner side of the disk region 9, the trigger wheel 1 merges into a side wall 3 or a side wall region, which side wall 3 extends substantially in the axial direction along the longitudinal axis 2. In this case, the trigger wheel 1 is made from a formed sheet-metal part and its individual regions 3, 8, 9 are thus of integral design. As can also be seen in FIG. 9, the side wall 3 is in principle divided into two partial regions. A first partial region has a substantially rectangular or square cross-section, whereas a second partial region axially adjoining the first partial region has a round (circular) cross-section. The side wall 3 extends away from the disk region 9 on the same axial side as the sleeve region 8.

According to the disclosure, two formed features 5 arranged offset relative to one another in the circumferential direction are implemented on the side wall 3, namely in the second partial region of the side wall 3. The formed features 5 are implemented as protrusions and are produced by forming techniques. As can also be seen particularly well from FIGS. 9 to 12, each formed feature 5 is in principle made to project outward in a radial direction from the second partial region of the side wall 3, said region extending in a circular shape. The formed feature 5 resembling a bead has a tab 7, which tab 7 is provided/shaped with a wave profile 6. The wave profile 6 is also particularly clearly visible in FIG. 2. Here, it becomes clear that the tab 7 is freed, namely punched out on the two mutually opposite axial sides thereof from the remaining region of the side wall 3 or the formed feature 5. The tab 7 can be formed in the radial direction by a punch, wherein the punch already has a negative form of the wave profile 6. The tab 7 is folded over inward in the radial direction thereof in relation to the formed feature 5. As can be clearly seen in FIG. 2, the wave profile 6 is implemented substantially in a W shape or a bird wing shape.

Figure 1:
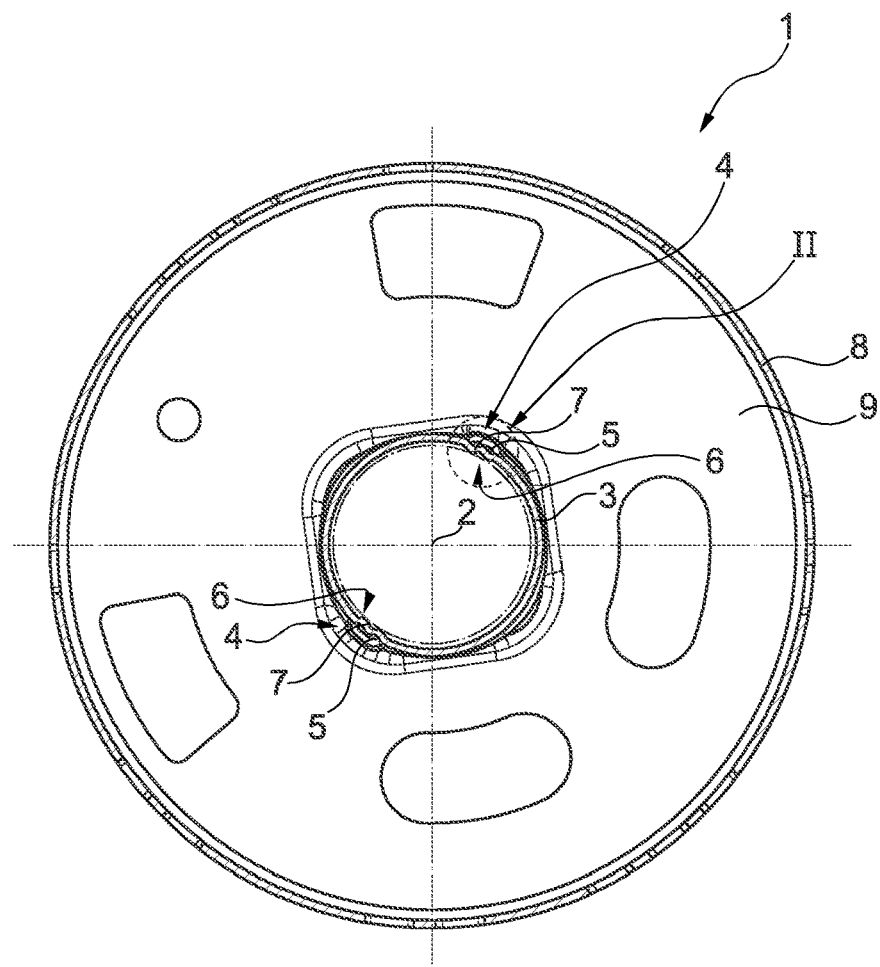
FIG. 1 shows a cross-sectional illustration of a trigger wheel according to the disclosure in accordance with an example embodiment, wherein the section plane is chosen in such a way that two formed features, each forming a wave profile, are readily visible on a side wall of the trigger wheel.
Figure 2:
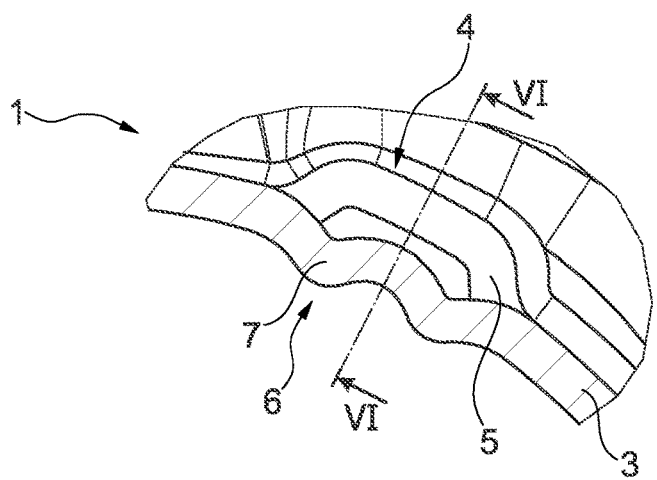
FIG. 2 shows a detail of the region indicated by "II" in FIG. 1.
Figure 3:
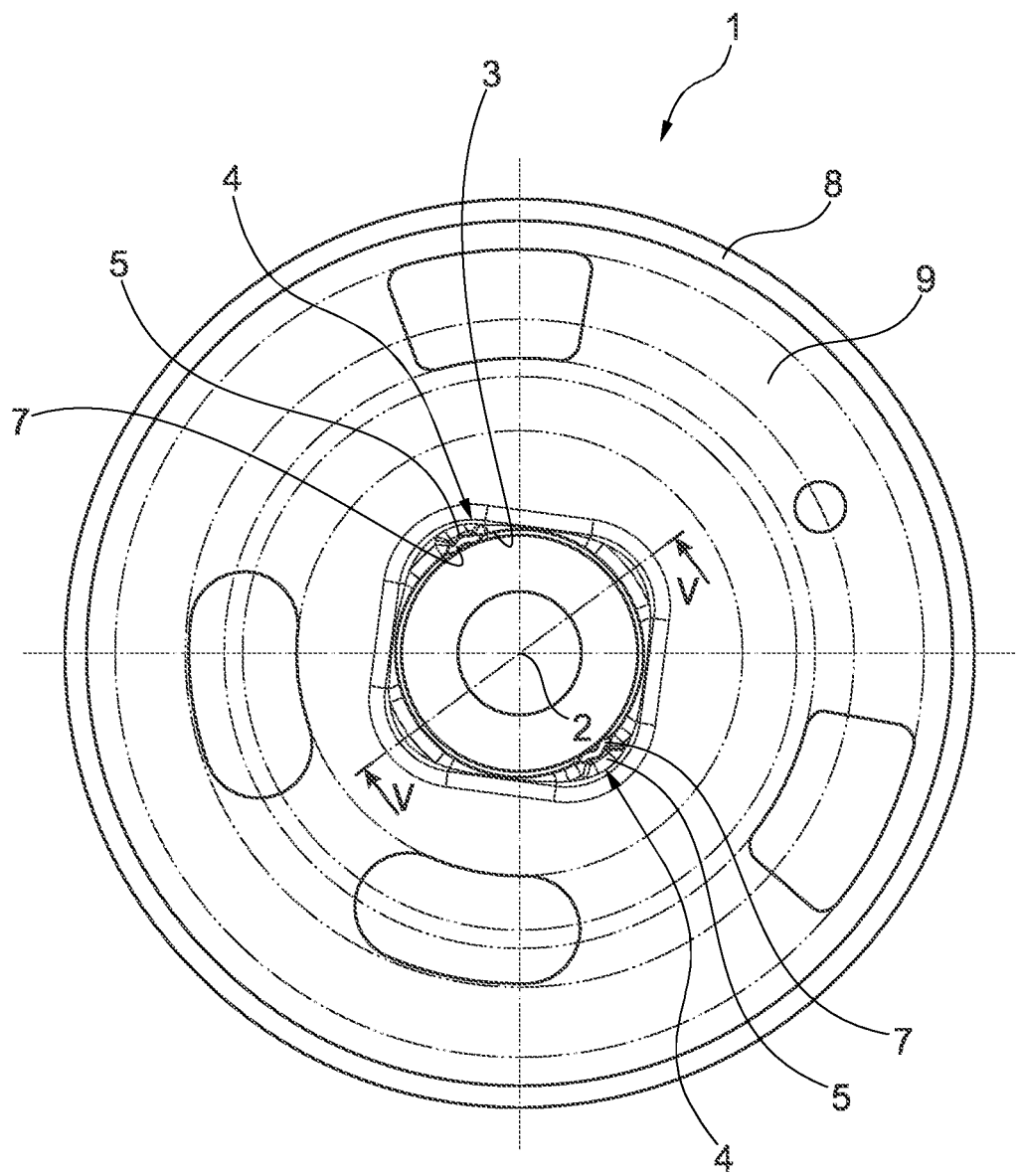
FIG. 3 shows a front view of the trigger wheel.
Figure 8:
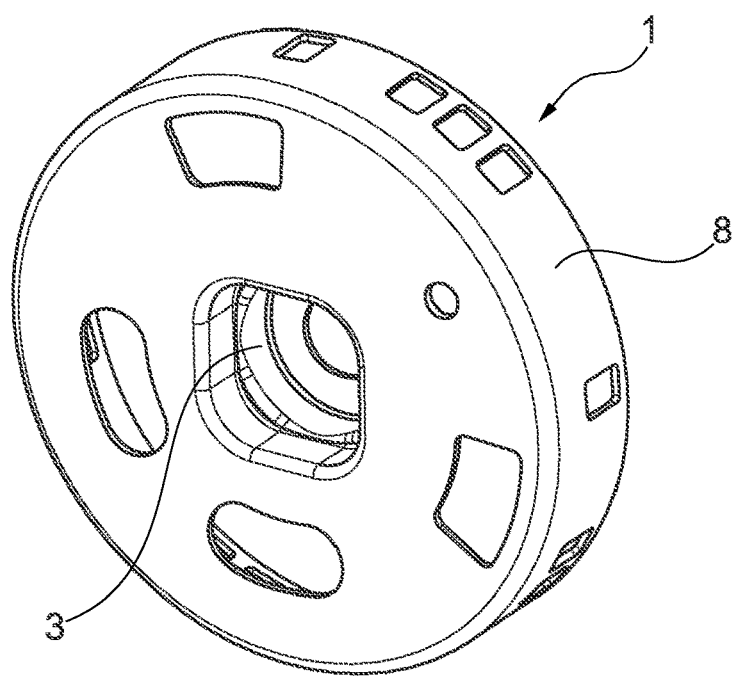
FIG. 8 shows a perspective illustration of the complete trigger wheel.

As shown in FIGS. 1 and 3, the two formed features 5 are formed in mutually spaced circumferential regions 4. As viewed in the circumferential direction, the centers of gravity of the formed features 5 are offset relative to one another at an angle of less than 180 degrees.

For the sake of completeness, attention is furthermore drawn to the fact that the trigger wheel 1 in another embodiment is also designed as a spring mounting wheel. In another embodiment it is even possible to dispense with a corresponding contour for triggering the speed and/or rotational position and for the wheel 1 to be designed exclusively as a spring mounting wheel.

In other words, it is thus possible according to the disclosure to implement a projection (formed feature 5) selectively in a similar way to a bird wing. The projection 5 is formed inward in relation to the center of the part.

LIST OF REFERENCE CHARACTERS

1 trigger wheel
2 longitudinal axis
3 side wall
4 circumferential region
5 formed feature
6 wave profile
7 tab
8 sleeve region
9 disk region

The invention claimed is:

1. A camshaft adjuster configured for an internal combustion engine, the camshaft adjuster comprising:
   a stator,
   a rotor rotatable relative to the stator, and
   a trigger wheel having:
      a rotational axis, and
      a side wall extending along the rotational axis, the side wall having a tab formed with a wave profile, the tab cut from the side wall forming two opposite axial sides of the tab so that each axial side of the tab is separated from the side wall, and a first end of the tab and a second end of the tab are formed integrally with the side wall.

2. The camshaft adjuster as claimed in claim 1, wherein the wave profile extends circumferentially around the rotational axis in a shape of a W.

3. The camshaft adjuster as claimed in claim 1, wherein a portion of the side wall proximate to an axial side of the tab projects outward in a radial direction.

4. The camshaft adjuster as claimed in claim 3, wherein the tab projects inward in a radial direction.

5. A camshaft adjuster configured for an internal combustion engine, the camshaft adjuster comprising:
   a stator,
   a rotor rotatable relative to the stator, and
   a trigger wheel having:
      a rotational axis,
      a disk region that extends radially from the rotational axis, the disk region merging into a side wall, the side wall extending from a radially inner portion of the disk along the rotational axis, and
      at least one protrusion, a first portion of the at least one protrusion projecting radially outward from a circumferential region of the side wall, a second portion of the at least one protrusion forming a tab, the tab cut and separated from the at least one protrusion or the side wall on two opposite axial sides, and a first end of the tab and a second end of the tab are formed integrally with the side wall.

6. The camshaft adjuster as claimed in claim 5, wherein the tab is formed with a wave profile.

7. The camshaft adjuster as claimed in claim 6, wherein the wave profile extends circumferentially around the rotational axis in a shape of a W.

8. The camshaft adjuster as claimed in claim 5, wherein the tab is formed as a bird wing.

9. The camshaft adjuster as claimed in claim 5, wherein the tab projects radially inward.

10. The camshaft adjuster as claimed in claim 5, wherein the side wall includes:
    a first partial region having a substantially rectangular cross-section or square cross-section; and,
    a second partial region axially adjoining the first partial region, the second partial region having a circular cross-section and including the circumferential region.

11. The camshaft adjuster as claimed in claim 5, further comprising a radial outer sleeve region that extends from a radially outer portion of the disk region along the rotational axis.

12. The camshaft adjuster as claimed in claim 11, wherein the side wall and the radial outer sleeve region extend away from the disk region on a same axial side of the disk region.

13. The camshaft adjuster as claimed in claim 11, wherein the side wall, disk region and radial outer sleeve region are integrally formed within a sheet-metal part.

14. The camshaft adjuster as claimed in claim 5, wherein the at least one protrusion comprises a first protrusion and a second protrusion.

15. The camshaft adjuster as claimed in claim 14, wherein a center of gravity of the first protrusion is angularly offset from a center of gravity of the second protrusion at an angle of less than 180 degrees.

16. A camshaft adjuster configured for an internal combustion engine, the camshaft adjuster comprising:
   a stator,
   a rotor rotatable relative to the stator, and
   a trigger wheel having:
      a rotational axis, and
      a side wall extending along the rotational axis, the side wall having at least one protrusion, a first portion of the at least one protrusion projecting radially outward from a circumferential region of the side wall, a second portion of the at least one protrusion forming a tab, the tab cut and separated from the at least one protrusion or the side wall on two opposite axial sides, and a first end of the tab and a second end of the tab are formed integrally with the side wall.

* * * * *